W. F. O'DONNELL.
SPRING HOSE COUPLING.
APPLICATION FILED OCT. 5, 1915.
1,173,211.
Patented Feb. 29, 1916.
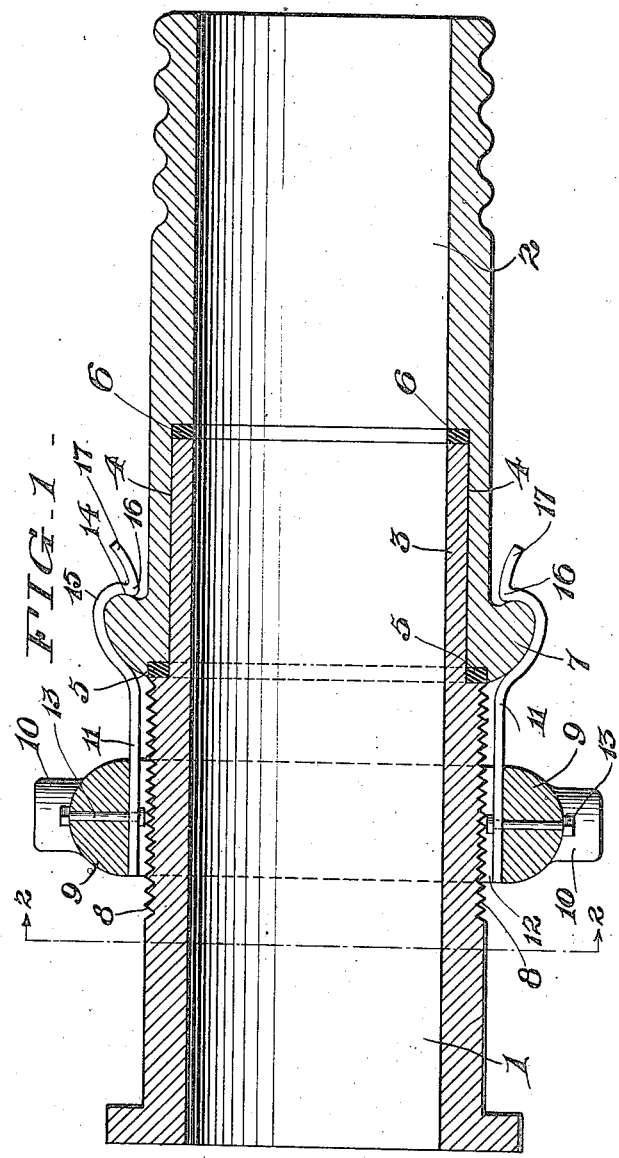
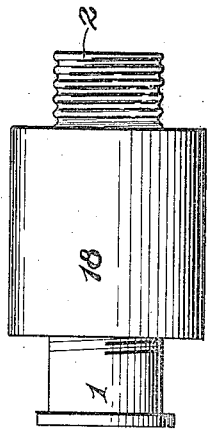
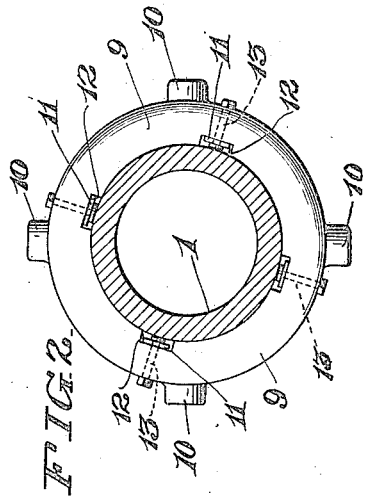
Witnesses
William Conway.
C. R. Ziegler.
Inventor
William F. O'Donnell
By Joshua R. H. Potts.
his Attorney

UNITED STATES PATENT OFFICE.

WILLIAM F. O'DONNELL, OF TRENTON, NEW JERSEY.

SPRING HOSE-COUPLING.

1,173,211.   Specification of Letters Patent.   Patented Feb. 29, 1916.

Application filed October 5, 1915. Serial No. 54,126.

*To all whom it may concern:*

Be it known that I, WILLIAM F. O'DONNELL, a citizen of the United States, residing at Trenton, in the county of Mercer and State of New Jersey, have invented certain new and useful Improvements in Spring Hose-Couplings, of which the following is a specification.

My invention relates to improvements in spring hose couplings, the object of the invention being to provide a joint or coupling which is adapted for use in connection with water, steam, or air, and which permits the two members to pull apart before the pipe or hose is injured.

A further object is to provide a coupling of the character stated in which one member is provided with external screw-threads upon which a ring is adjustable and carries a plurality of spring gripping tongues which spring into holding engagement with an annular enlargement on the other member of the joint or coupling, and securely holds the members together, yet permits them to be separated when an extraordinary strain is had.

A further object is to provide a coupling of the character stated which is capable of adjustment to tighten the same, and which embodies in its construction various novel details which coöperate in the performance of improved results.

With these and other objects in view, the invention consists in certain novel features of construction and combinations and arrangements of parts as will be more fully hereinafter described and pointed out in the claims.

In the accompanying drawings: Figure 1 is a view in longitudinal section illustrating my improved coupling. Fig. 2 is a view in transverse section on a reduced scale on the line 2—2 of Fig. 1, and Fig. 3 is a view in elevation illustrating my improved coupling covered by a protecting shield.

1 and 2 represent the two members of my improved coupling or joint. Member 1 is reduced in diameter at one end as shown at 3, which fits in an annular recess 4 in the other member 2, so that while the two members telescope one within the other, they do not interfere with the passage in the coupling, and gaskets 5 and 6 are located at the respective ends of the reduced portion 3, so that when the two members of the coupling are forced together, a tight joint will be had.

Member 2 is provided at its inner end with an integral annular enlargement 7, and member 1 is externally screw-threaded as shown at 8 to mesh with internal screw-threads in a ring 9 adjustable on member 1.

The ring 9 is provided on its outer face with a plurality of knobs 10 adapted to be struck by a hammer or be engaged by any other tool to turn the ring and adjust the same for a purpose which will hereinafter appear. The ring 9 carries a plurality of spring gripping tongues 11. These spring tongues 11 are secured in recesses 12 in the inner wall of ring 9, and while of course, the particular manner of securing the tongues is immaterial, I have shown ordinary screws or bolts 13 for the purpose.

The annular enlargement 7, adjacent member 1, is curved convexly, but on its face farthest removed from member 1, is curved in a general concaved direction forming what I shall hereinafter refer to as an annular groove 14.

The spring tongues 11, adjacent their free ends, are curved as shown at 15 to conform in general curvature to the curvature of the enlargement 7 in cross section, so that said tongues adjacent their free ends have a hook 16 which rides into the groove 14, and exerts a strong gripping action on the enlargement 7.

The extreme free ends of the tongues 15 are curved outwardly as shown at 17, so that they cause the tongues to spring outwardly in riding over the enlargement 7, when the two members of the coupling are moved together. In other words, the ends 17 constitute cam faces which direct the spring clamping tongues into holding position, and due to the shape of the enlargement 7 and the tongues 11, a strong gripping action is had which is sufficient to withstand all ordinary strains, but not sufficient to prevent separation of the coupling due to an extraordinary strain which would injure the pipe or hose.

It will be noted that with my improved coupling, after the tongues 11 are in holding or locking position, the ring 9 can be adjusted to tighten the two members of the coupling, compressing the gaskets, hence while the two members spring into locked position, they can be further tightened within certain limits by the movement of the ring 9.

To protect the coupling from dirt and foreign matter, I may slip a shield 18 over the ring 9 and coöperating parts as shown in Fig. 3, but of course the invention is not limited to the shield, or any particular manner of constructing the same.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A coupling of the character described, comprising two members, one fitting within the other, one member having an annular enlargement thereon, the other member externally screw-threaded, a ring internally screw-threaded and engaging the first-mentioned threads, and a plurality of spring gripping tongues secured directly to said ring and engaging the annular enlargement, said enlargement and gripping tongues having curved engaging faces permitting under undue strains the separation of the members, substantially as described.

2. A coupling of the character described, comprising two members, one fitting within the other, one member having an annular enlargement thereon, the other member externally screw-threaded, a ring internally screw-threaded and engaging the first-mentioned threads, said ring having internal recesses, a plurality of longitudinally positioned spring gripping tongues secured in the recesses of the ring and turning with the ring, said tongues having engaging faces corresponding to the shape of the annular enlargement and holding the members together, substantially as described.

In testimony whereof I have signed my name to this specification in the presence of two subscribing witnesses.

WILLIAM F. O'DONNELL.

Witnesses:
DOMINIC O'DONNELL, Jr.,
ELIAS L. DURN.